Patented Dec. 23, 1947

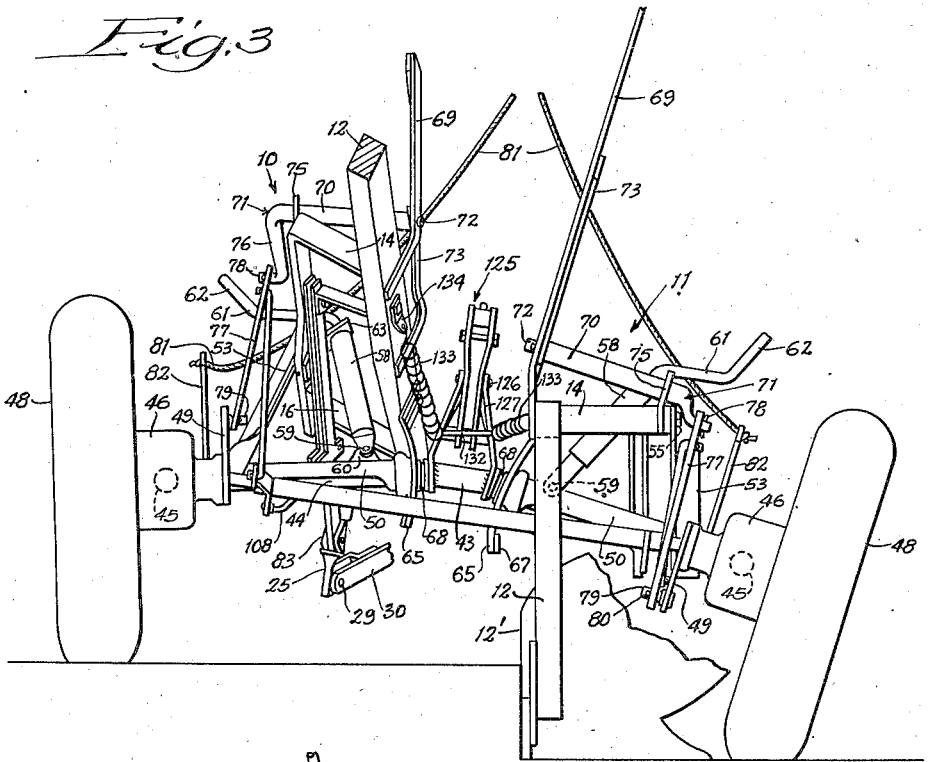

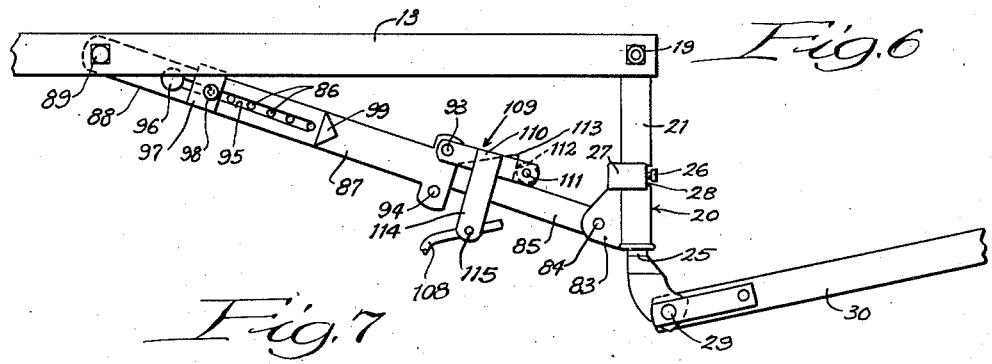
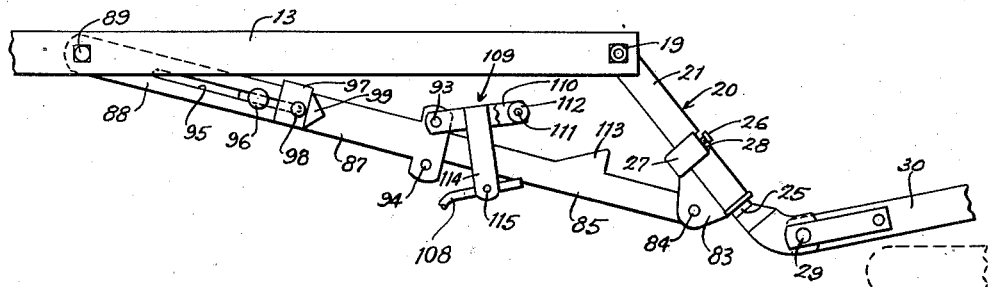
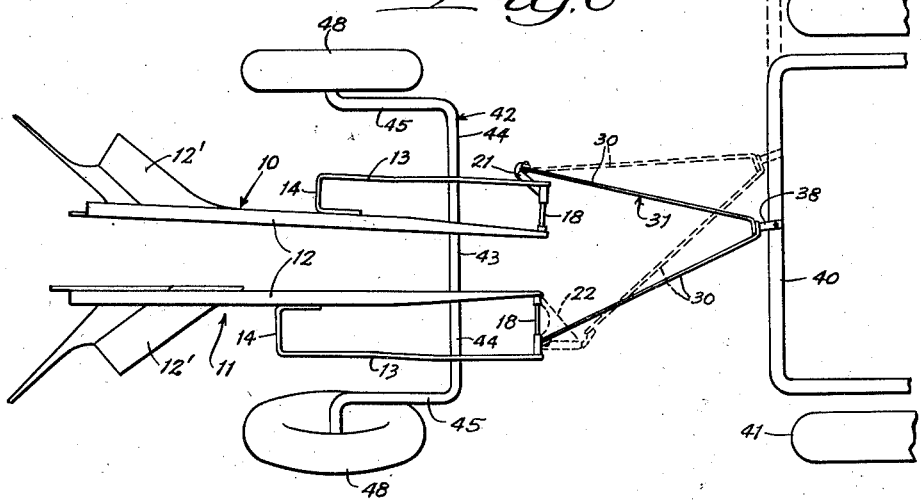

2,433,147

UNITED STATES PATENT OFFICE 2,433,147

AGRICULTURAL IMPLEMENT

John R. Orelind, Wilmette, and James Morkoski, Canton, Ill., assignors to International Harvester Company, a corporation of New Jersey Application June 28, 1943, Serial No. 492,476

15 Claims. (Cl. 97—29)

This invention relates to agricultural implements, and more particularly to implements of the trailing type adapted for attachment to a tractor or other vehicle to be drawn therebehind. More specifically, the invention is concerned with two-way plows having a pair of plow elements arranged for alternate operation.

Two-way plows are well known in the agricultural industry. Their function is to cut adjacent furrows and permit the rear wheel on one side or the other of the tractor to always travel in the previously made furrow as the plow is drawn back and forth across the field, the plow bottoms being arranged for alternate operation in opposite directions. It is essential that the tractor wheel travel in the furrow previously made in order to establish the position that the working plow bottom must occupy with respect to that wheel to maintain a uniform width of cut. It is clear, therefore, that, in traversing a field, alternate rear wheels of the tractor must travel in the previously made furrow, and that alternately operating plow bottoms must occupy the proper position with respect to the adjacent tractor wheel. With a tractor having fixed rear wheel spacing and a trailing plow designed for that particular tractor, this correct positioning of the plow bottoms presents no problem. However, were the tractor wheels adjustable for wider or narrower spacing, or were the same plow drawn by a different tractor having different wheel spacing, the working plow bottom could not assume the position necessary for a uniform width of cut unless provision were otherwise made for adjusting the hitch point of the plow upon the tractor. With the increased tempo of modern diversified farming and the trend toward multi-purpose implements and tractors, it is important that an implement of the type referred to be adaptable to tractors of various sizes and wheel spacings without the tedious adjustments previously required.

Therefore, it is the principal object of the present invention to provide in a two-way plow means for automatically moving the hitch point to place the working plow bottom in correct position with respect to the furrow wheel of the tractor.

Another object of the invention is to provide in a two-way plow means for laterally moving the hitch means on the implement within fixed limits determined by the space between the tractor wheels, and means for varying these limits to accommodate the implement to tractors having different wheel spacings.

A further object is to provide in a two-way plow novel means for effecting laterally outward diversion of the inoperative plow bottom to minimize the danger of its contact with the working element.

Still another object of the invention is the provision of an improved hitch device mounted on the implement and associated with forwardly projecting ends of the plow bottoms, said hitch device being swingable laterally and movable vertically with respect to the plow beams. These and other objects will become clear from the following detailed description when read in conjunction with the accompanying drawings, wherein:

Figure 3 is a rear elevation of the plow shown in Figures 1 and 2;

Figure 4 is a perspective detail, partly in section, showing a portion of the device by which the locking mechanism for the hitch frame is released to permit lateral movement thereof;

Figure 5 is a detail of a portion of the hitch mechanism;

Figure 6 is an enlarged detail of a portion of the hitch frame on one side of the plow and a locking mechanism therefor, and showing that side of the frame in locked position;

Figure 7 is a view similar to Figure 6, but showing the locking mechanism released to permit lateral movement of the hitch frame; and Figure 8 is a diagrammatic plan view showing in dotted lines the position of the hitch frame when the plow is propelled by a wide tread tractor and, in solid lines, the position of the hitch with respect to a tractor having a neutral rear wheel spacing.

Figure 1:
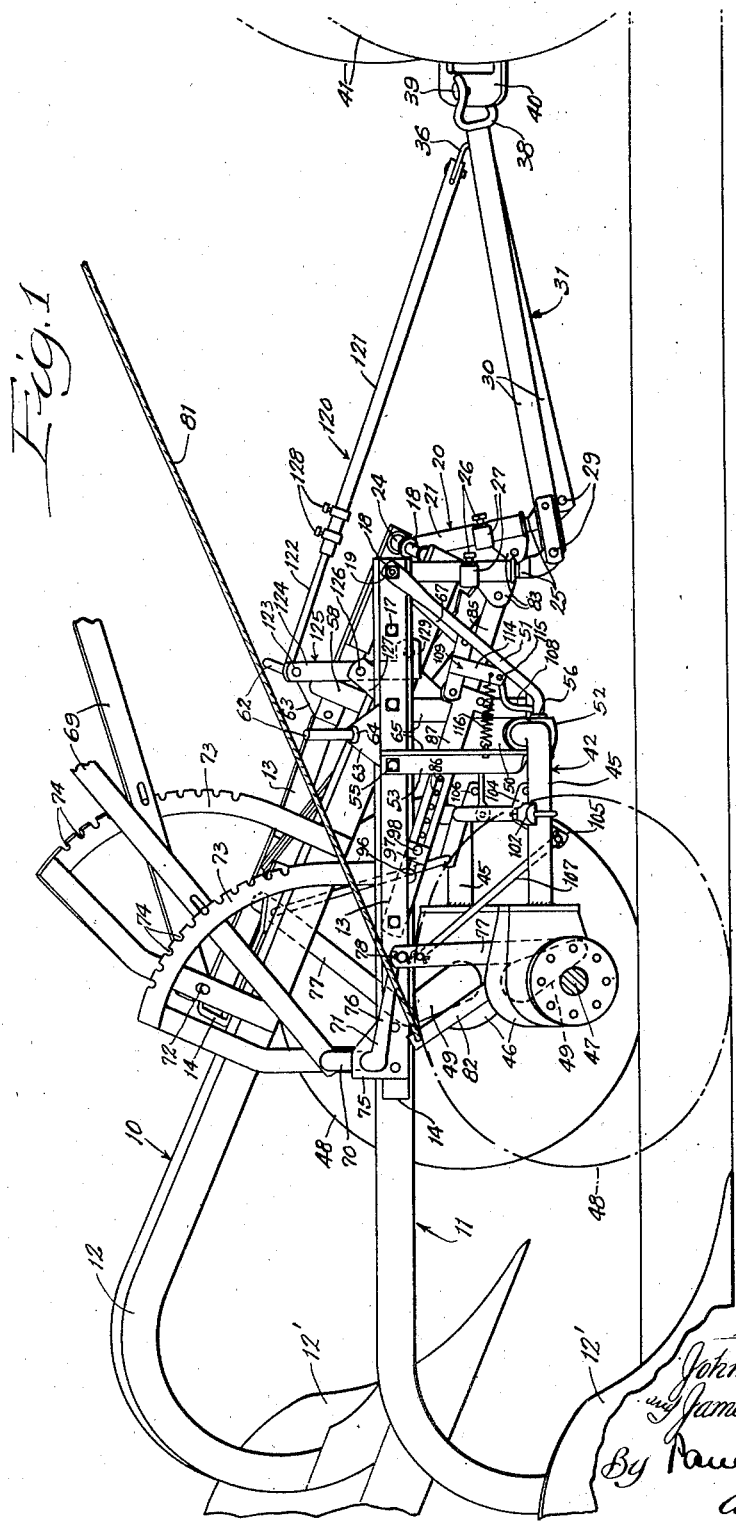
Figure 1 is a view in side elevation of a two-way plow embodying the principles of the present invention, attached to a tractor, and showing the left-hand plow bottom in raised position.

Referring to the drawings, the two-way plow of the present invention includes a pair of plow elements 10 and 11, and, inasmuch as both elements are substantial duplicates, the description of one will suffice for both. It will be noted that each plow element 10 and 11 comprises a longitudinally extending beam 12 having mounted upon the rear end thereof a plow bottom 12'. Beams 12 are laterally spaced and converge slightly toward their forward ends. Generally parallel to each beam and extending longitudinally thereof for a considerable distance is a bracket 13 having an inwardly bent end 14 attached by a bolt 15 to the outer face of the beam. The forward end of the bracket 13 is made fast to the beam by a U-shaped member 16 affixed to the bracket and the beam by bolts 17. The free forward ends of beam 12 and bracket 13 are connected by a bolt 18 having nuts 19 upon the outer ends thereof. Depending from bolt 18 and pivotally mounted thereupon is a member 20 comprising a sleeve portion 21 and a bracing arm 22 provided with bosses 23 and 24 having openings for the reception of bolt 18, and abutting beam 12 and bracket 13, respectively, to prevent lateral movement of member 20. Sleeve 21 receives for sliding movement therein a shaft 25, which may be telescoped with respect to the sleeve to vary the effective length of member 20, and may be held in a number of adjusted positions by a set-screw 26 which may be seated in one of a number of openings, (not shown) provided in the shaft 25. In order to permit limited axial rotation of shaft 25 and sleeve 21, the sleeve is provided with an enlarged portion 27 having a slot 28 therein (see Figure 2) for the reception of set-screw 26. The lower end of each shaft 25 is flattened and apertured to receive a pin 29, upon which is mounted for vertical pivotal movement the bifurcated rear end of a hitch member 30, forming one arm of a hitch frame generally indicated at 31. Hitch members 30 converge forwardly and are provided at their forward ends with bent portions 32 and 33, overlapping and having registering openings to receive for sliding movement a rearwardly extending rod 34, surrounded by a spring 35. The forward end of spring 35 abuts against a clevis 36 and the rear end against nuts 37 by which the tension upon the spring may be varied. The forwardly projecting end of rod 34 is affixed to the closed end of a clevis 38 provided with a member 39 for attachment to the draw-bar 40 of a tractor having rear wheels 41. Spring 35 imparts flexibility to the hitch connection of the implement to the tractor. Since members 20 on both plow elements are pivotally mounted for longitudinal movement, it is clear that, upon restraining pivoting of one member 20 and permitting pivotal movement of the other, hitch frame 31 may be swung laterally with respect to the implement. Movement of members 20 to effect lateral movement of the hitch frame is under the control of mechanism to be hereinafter described.

Plow elements 10 and 11 are supported on opposite sides of a U-shaped axle 42, which includes a transverse portion having a mid-portion 43, downwardly angled side portions 44, and rearwardly extending arms 45. The end of each arm 45 is secured as by welding to a clutch housing 46 enclosing a half-revolution clutch, the interior details of which form no part of the present invention. However, it may be noted that the clutch includes a stub axle 47, visible in Figure 1, the outer end of which journals a wheel 48, and the inner end of which has affixed thereto one end of a lifting arm 49. Each downwardly angled side portion 44 of axle 42 is provided with a rotatable sleeve 50, upon which plow elements 10 and 11 are respectively mounted for vertical pivotal movement. The means by which the plow element is secured to sleeve 50 includes a strap 51, one end of which is mounted on the outer end of bolt 18 and held in place thereon by nut 19. The other end of strap 51 is bent and passes through an opening in a boss 52 integral with the outer end of the sleeve 50 and extending therebelow. The lower end of a brace 53 is secured to the end of the strap 51, projecting from the boss 52, by a nut 54, and the upper end of the brace is affixed to bracket 13 by a bolt 55. Strap 51 is provided with a shoulder 56 to prevent sliding movement thereof in boss 52, but the connections are sufficiently loose to permit limited axial rotation thereof for a purpose hereinafter explained.

Further supporting the plow element upon sleeve 50 in such a way as to permit controlled pivotal movement of the element about the bent portion of strap 51 as an axis, is a crank 57, comprising a sleeve 58 having a bifurcated lower end pivotally mounted upon a pin 59, seated in a lug 60, affixed to the sleeve 50 near its inner end. Sleeve 58 is interiorly threaded to receive a threaded crank arm 61 having a handle 62. Arm 61 passes through a plate 63 bolted to bracket 13 and is secured against sliding movement by a collar 64. Upon turning the handle 62, the distance between the plate 63 and sleeve 50 may be increased or decreased to cause pivotal movement of the plow element about the bent portion of strap 51 and, therefore, change the angular relationship of the plow beam 12 with respect to the axle 42 and the ground, in order to properly level the plow bottom 13. In order to strengthen the mounting of the plow elements and to serve as a guide for the leveling device, a pair of spaced straps 65 is provided, the upper ends of which are secured to the beam 12 by bolts 66, and the lower ends secured to a brace 67, one end of which has an opening to receive the inner end of bolt 18 and is held in place by nut 19. Straps 65 straddle the inner end of sleeve 50 to form a guide track, and their inner edges contact a groove 68 formed between enlargements on the sleeve. It will be noted that straps 65 are arcuate, so that in leveling the plow beams by manipulating the crank 57, the beam 12 moves over a portion of a circle having as a center the point of pivot of the bent portion of strap 51 in boss 52.

It should now be clear that plow beams 12 are independently pivotally mounted at a point near the forward ends thereof upon the transverse portion of axle 42, and may be angled with respect thereto to level the plow bottoms. The mechanism by which raising and lowering of the plow elements is effected includes a lever 69, one for each plow element. The lever 69 has affixed to the lower end thereof, as by welding, an arm 70 of a crank 71 having an extension 72 pivoted upon a quadrant 73 secured to beam 12. Lever 69 is provided with conventional detent mechanism to engage notches 74 in the quadrant. Arm 70 is supported in an opening in a standard 75 attached to bracket 13, and the other arm 76 of crank 71, extending at right angles with respect to arm 70, is bent at its end for insertion in an opening in one end of a link 77, and secured against displacement by a cotter-pin 78. The lower end of link 77 has an opening to receive a pin 79 fast on the end of lifting arm 49, held in place by a cotter-pin 80. As stated hereinbefore, clutch housing 46 encloses a stub axle 47, which journals a wheel 48 at one end and has lifting arm 49 affixed to the other. Power for rotating lifting arm 49 is transmitted through a half-revolution clutch enclosed in the housing 46, from wheel 48, the operation of the clutch being under the control of the operator through a cable 81 attached to a tripping lever 82. Thus, when it is desired to move one of the plow bottoms to or from working position, the lever 82 is tripped to engage the clutch parts and cause lever arm 49 to move clockwise, as viewed in Figure 1, through a 180° arc, and, acting through link 77 and crank 74, to raise or lower beam 12 about its pivot on axle 42. To reverse the movement of the plow bottom, the lever 82 is again tripped to engage the clutch and cause arm 49 to again rotate clockwise through a 180° arc. Since plow elements 10 and 11 and the mechanisms for raising and lowering thereof are substantial duplicates, it should be clear that each is independently operable through its respective supporting wheel. Depth adjustment of the plow beams in working position may be made by manipulating lever 69.

It should now be understood that a two-way plow has been described having alternately operable elements and longitudinally pivotable members on the front ends thereof, whereby the hitch frame 31, which serves to connect the plow to a tractor or other vehicle, may be permitted to move laterally to cause the working plow element to assume the correct plowing position with respect to its adjacent tractor wheel and produce furrows of uniform width as the plow travels back and forth across the field. As explained before, assuming the tractor drive wheels to be of a certain spacing, the plow bottoms will assume correct plowing position with regard to the respective tractor wheels without movement of the hitch point. On the other hand, if a tractor be employed having a wider or narrower rear wheel spacing, the hitch point must be moved laterally in one direction or the other to permit the supporting wheel of the working plow element to travel in the previously made furrow behind the adjacent tractor wheel. To accomplish this purpose, one of the members 20 must be allowed to pivot while the other is held rigid. For this reason, a locking mechanism is provided for each member 20, which may be automatically released in response to the movement of the plow bottoms to working position. The mechanism by which this is effected is presently to be described.

Integral with the lower end of sleeve portion 21 of pivotable member 20 are rearwardly projecting lugs 83, and, pivotally mounted therebetween upon a pin 84, is a rearwardly extending shaft 85, of rectangular cross-section, having openings 86 therethrough at spaced points therealong (see Figures 6 and 7). The rear end of shaft 85 telescopes into a sleeve 87, comprising laterally spaced plates 88, pivoted at their rear ends upon a bolt 89, extending through bracket 13, and supported by an angle bar 90, having one end mounted on bolt 89 secured by a nut 91, and the other end affixed to beam 12 by bolt 15. The forward ends of plates 88 are T-shaped, and are connected by vertically spaced pins 93 and 94, adapted to confine the upper and lower surfaces of shaft 85. Plates 88 are provided with registering longitudinal slots 95, which are in turn arranged to register with the openings 86 in shaft 85, and maintained in registry therewith by means of a pin 96, fastened to the rear end of shaft 85 and projecting through slots 95.

The extent of telescoping movement of shaft 85 and sleeve 87 is limited and adjusted by a U-shaped strap 97, adapted to fit loosely over the sleeve 87, and having a pin 98 extending through one of the openings 86 and the slots 95. The maximum extension of the telescoping parts is obtained by placing the pin 98 in the rearmost opening 86 in shaft 85, the movement of the parts being limited by contact of one edge of clamp 97 with a lug 99 affixed to plate 88. When no extension of the telescoping parts is desired, as when the plow is drawn behind a tractor having a rear wheel spacing requiring substantially no movement of the plow hitch frame in order to correctly position the working plow bottom with respect to its adjacent tractor wheel, the pin 98 is withdrawn and the strap moved forwardly on the sleeve 87 until the pin can be inserted in the forwardmost opening 86 in shaft 85. In this position the forward edge of the strap abuts the lug 99.

The plow of the present invention has been designed to trail behind a tractor having a rear wheel spacing of sixty-four (64) inches, without movement of the telescoping parts, and without lateral movement of the hitch frame other than that caused by the slight rearward deflection of the lower end of one of the pivotable members 20, due to the angle assumed by the raised plow element. In Figure 8, the tractor wheels have a sixty-four inch spacing, and the position of the hitch frame of the plow therein is shown in solid lines. For extremes of narrow and wide tractor wheel spacings, as forty (40) inch and eighty-four (84) inch spacings, the strap 97 is moved rearwardly and pin 98 inserted in the rearmost slot, as clearly shown in Figures 6 and 7, thus securing maximum expansion of the telescoping parts. The other openings 86 are provided in shaft 85 to vary the extent of movement of the telescoping parts and, therefore, lateral movement of the hitch frame 31 to conform to tractor wheel spacings of varying widths. It may be noted that the openings 86 in shaft 85 are spaced one inch apart; however, it may also be noted that pin 98 is offset from the center of the strap 97. Thus, by removing pin 98 and reversing the strap on sleeve 87, the edge of the strap farthest from the pin will abut the lug 99, and half-inch adjustments may be made.

Figure 2:
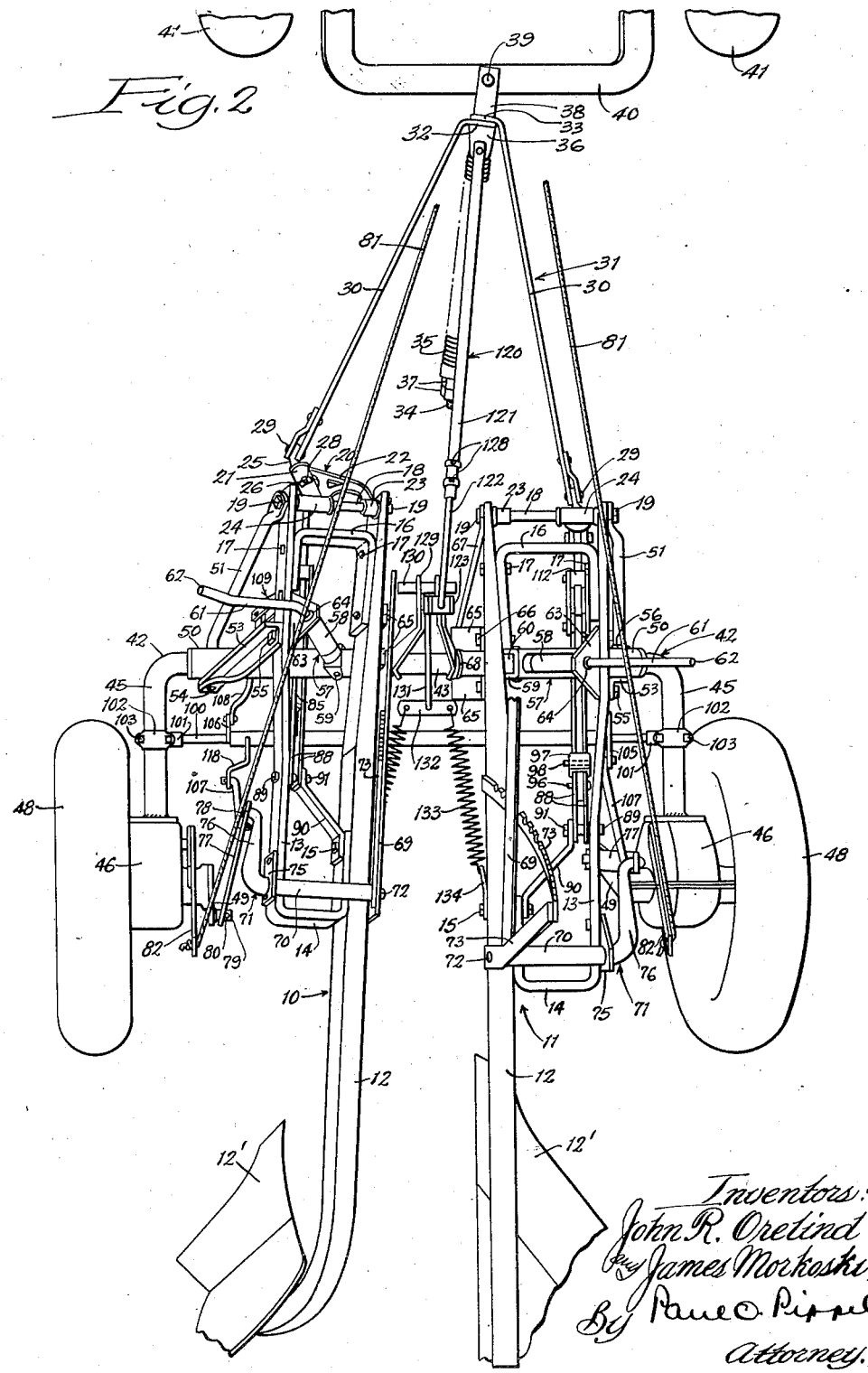
Figure 2 is a plan view of the plow shown in Figure 1 with the left-hand plow raised to inoperative position and illustrating the position assumed by the hitch frame when the plow is propelled by a narrow tread tractor.

In Figures 1 to 3, the plow is shown being drawn by a tractor having a rear wheel spacing of forty inches. It will be noted that the right-hand plow element is in working position and that the left-hand pivotable member 20 has been moved forwardly to cause lateral movement of hitch frame 31 to the right, thus bringing the working plow bottom into correct plowing position with respect to the right-hand tractor wheel 41. Clearly, when the direction of plowing is reversed and the left-hand plow element replaces the right-hand element in working position, the left-hand member 20 must be retracted and the right-hand member 20 extended to cause hitch frame 31 to move to the left and bring the working plow bottom into correct position with respect to the left-hand tractor wheel 41. On the other hand, when, as indicated in the dotted lines in Figure 8, a tractor having rear wheel spacing of eighty-four inches is employed, in order for the right-hand plow bottom to assume proper relationship with the right-hand tractor wheel, the right-hand member 20 must be pivoted forwardly and the hitch frame 31 swung to the left, and vice versa upon reversing the direction of plowing. These movements of the hitch frame are actuated by movement of the inoperative plow element to working position through the intermediary of a mechanism now to be described. As pointed out before, maximum extension of the telescoping parts 85 and 87 is obtained when pin 98 is inserted in the rearmost opening 86 in shaft 85. These parts are held against extension when the plow is in transport position, and the lock on one plow element is released when one plow bottom is lowered to working position. This locking mechanism and the means by which it is actuated includes a rock-shaft 100 (see Figures 2 and 4) extending transversely of the implement, opposite ends of which are seated in sockets 101 in brackets 102 attached to the arms 45 of axle 42 by means of U-bolts 103. Rock-shaft 100 is provided near its right-hand end with a forwardly extending lug 104 and a rearwardly extending arm 105 and, near its left-hand end, with a forwardly extending lug 106. Arm 105 is connected by a rod 107 to the upper portion of link 77, while lug 106 at the left end of rock-shaft 100 is connected by a link 108 to a latching mechanism 109. Latch 109 includes spaced plates 110 pivoted rearwardly upon pin 93 and connected forwardly by a pin 111 mounting a roller 112, the space between pin 93 and roller 112 being sufficient to accommodate a lug 113 on shaft 85. An arm 114 affixed to one of the plates 110, as by welding, extends therebelow, and is bifurcated at its lower end to receive a pin 115, upon which is pivoted the forward end of link 108.

Assuming for purposes of illustration that both plow elements 10 and 11 are in transport position, with latches 109 engaging lug 113, and the right-hand plow bottom is to be lowered to working position, tripping lever 82 on the right-hand plow element is actuated, causing the clutch to engage and rotate lifting arm 49 through a half revolution to the position indicated in dotted lines in Figure 1, carrying with it link 77 and rod 107, thereby depressing arm 105 and raising lug 106 to release latch 109 on the left-hand plow element. The release of the left-hand latch 109 permits extension of the telescoping parts and, therefor, movement of the hitch frame 31 to the right, as indicated in Figure 2, in response to draft thereupon. Each latch mechanism 109 is biased to engaged position with lug 113 by a spring 116 (see Figure 1) attached to brace 53 and arm 114. Thus it is seen that initiation of movement of the right-hand plow bottom to working position, acting through rock-shaft 100, releases the latch 109 on the left-hand plow element to bring the right-hand plow bottom into correct plowing position.

Similar provision is made for releasing the right-hand latch 109 when the left-hand plow element is lowered to working position, a sleeve 116a being loosely mounted upon rock-shaft 100, having a forwardly extending lug 117 and a rearwardly extending arm 118 affixed to the left-hand end thereof, and a forwardly extending lug 119 secured to the right-hand end thereof. Arm 118 is connected to the lifting mechanism for the left-hand plow element in the same manner as that decribed for the connection of arm 105 to the right-hand lifting mechanism, while lug 119 is connected to the right-hand latching mechanism. The manner in which these connections are made is clearly shown in solid lines in Figure 4.

On the other hand, when the wheels of the tractor are eighty-four inches apart, as indicated in dotted lines in Figure 8, it is necessary that, when the right-hand plow element is to be placed in working position, the hitch frame 31 be swung to the left to properly aline the plow bottom with the tractor wheel. This requires release of the right-hand latch 109 for the telescoping parts 85 and 87 by the right-hand plow element. This is accomplished simply by disengaging links 108 from lugs 106 and 119, and connecting the links to lugs 117 and 104, respectively, so that the latch mechanism for each plow element is released by initiation of movement of that element to working position. The manner in which these connections are made is clearly shown in dotted lines in Figure 4.

In a plow of the type described, the line of draft is a theoretical straight line extending from the center of gravity of the working plow bottom to the point of attachment of the implement to the tractor. Since the point of attachment of the hitch frame to the implement must be slightly above this point in order to prevent the collection of trash near the ground, the rear of the plow has a tendency to rise out of the ground and the implement to pivot forwardly about its connection to the axle 42. To overcome this tendency, mechanism has been provided including a hitch member 120, adjustable in length, and comprising a sleeve 121 attached to the clevis 36 on the forward end of the hitch frame 31, and a shaft 122 pivoted on a pin 123 in one arm 124 of a bell-crank 125 (see Figure 5). The bell-crank is pivoted upon a pin 126 mounted in a bracket 127 affixed to the transverse portion of axle 42 between the plow elements 10 and 11. Hitch member 120 is made rigid by set-screws 128. The other arm 129 of the bell-crank is provided with forwardly bent lugs adapted to receive a pin 130 for pivotally mounting the threaded end of an eye bolt 131. Eye bolt 131 extends rearwardly and is connected to a crosspiece 132 extending laterally and having openings in each end for the attachment thereto of springs 133, the other ends of which are attached to lugs 134 secured to the sides of beams 12. It will be noted that clockwise movement of the bell-crank 125 is limited by the projecting ends of pin 130, which abut against the forward edge of bracket 127. By loosening set-screws 128, the effective length of hitch member 120 may be varied. When the implement is in the plowing position shown in Figures 1 to 3, and forward draft is exerted thereupon, hitch member 120, through bell-crank 125 and springs 133, exerts a yielding downward pressure against the rear end of the implement to hold it in the ground. When the plow elements are lifted to raised position for transport, the effective length of member 120 may be shortened to prevent the rear end of the implement from dropping downwardly. When it is desired to back up the plow in transport position, hitch member 120 functions to prevent forward tilting of the implement.

It will be noted particularly well in Figure 3 that, due to the angularity of the side portions of axle 42 and the angle at which plow elements 10 and 11 are mounted thereupon, the raised plow bottom is deflected laterally away from the working plow element and the sides of the beam 12 angle inwardly.

It should also be noted that a high clearance hitch for a trailing implement has been provided which minimizes the danger inherent in plows of conventional design of dragging too close to the ground and collecting trash or otherwise interfering with the satisfactory operation of the implement. Thus the hitch members 30 tilt upwardly from their points of connection with the depending members 20 to their point of connection with the draw-bar of the tractor. The only connection between the members 20 is provided by the forwardly converging hitch members 30, and there is no tendency on the part of the ends of members 20 to collect trash.

Having now described the invention, it should be understood that variations may be made therein without departing from the spirit thereof or the scope of the appended claims.

What is claimed is:

1. A two-way plow comprising a pair of plow elements adapted for plowing in opposite directions, lift means for independently moving said plow elements to and from ground-working position, longitudinally movable means associated with each said plow element, hitch means connecting said movable means, and means actuated by said lift means for permitting longitudinal movement of one said movable means in response to draft upon said hitch means.

2. A two-way plow comprising laterally spaced supporting wheels, means connecting said wheels, a pair of laterally spaced plow elements adapted for plowing in opposite directions mounted on said connecting means for alternate vertical movement to and from ground-working position, hitch means common to said plow elements, a longitudinally movable member associated with each said plow element, means connecting said hitch means and said movable members, and means responsive to draft upon said hitch means for effecting longitudinal movement of one or the other of said movable members to cause lateral movement of said hitch means.

3. A two-way plow comprising laterally spaced supporting wheels, means connecting said wheels, laterally spaced right- and left-hand plow elements adapted for plowing in opposite directions mounted on said connecting means for alternate vertical movement to and from ground-working position, lift means operated by each said wheel for independently moving said plow elements to and from ground-working position, right- and left-hand extensible members associated with said plow elements, hitch means connecting said members, and means actuated by said lift means for permitting alternate extension of said extensible members to move said hitch means laterally in response to draft thereupon.

4. An agricultural implement comprising, in combination, laterally spaced supporting wheels, means connecting and journaling said wheels, a pair of longitudinally extending tool beams mounted on said connecting means for vertical movement, working tools on the rear end of each beam, a longitudinally movable member on the forward end of each beam, a hitch frame, means pivotally connecting said frame to said members, and means actuated by the vertical movement of said beams for permitting independent movement of said members longitudinally in response to draft on the hitch frame, whereby to swing said hitch frame laterally.

5. An agricultural implement comprising, in combination, laterally spaced supporting wheels, means connecting and journaling said wheels, a pair of longitudinally extending, independently operable tool beams mounted on said connecting means for vertical movement, working tools on the rear end of each beam, a longitudinally movable member on the forward end of each beam, a hitch frame, means connecting said frame to said members, and means actuated by the vertical movement of one said tool beam for permitting longitudinal movement of one said member in response to draft upon said hitch frame, whereby to move said hitch frame laterally.

6. A two-way plow comprising, in combination, laterally spaced supporting wheels, means connecting and journaling said wheels, alternately operable plow elements mounted on said connecting means for alternate vertical movement to and from ground-working position, means for alternately moving said plow elements to and from working position, common hitch means connected to said plow elements, extensible means connecting each said plow element to said hitch means, and means actuated by the vertical movement of said plow element for permitting extension of one said extensible means in response to draft upon the hitch means to move said hitch means laterally.

7. A two-way plow comprising, in combination, laterally spaced supporting wheels, means connecting and journaling said wheels, alternately operable plow elements mounted on said connecting means for alternate vertical movement to and from ground-working position, means for alternately moving said plow elements to and from working position, common hitch means connected to said plow elements, extensible means connecting each said plow element to said hitch means, and means actuated by the vertical movement of said plow elements for controlling the extension of said extensible means in response to draft upon said hitch means, whereby said hitch means may be moved laterally to opposite sides of a neutral position.

8. In a two-way plow, in combination, laterally spaced supporting wheels, means connecting and journaling said wheels, alternately operable plow elements mounted on said connecting means for vertical movement to and from ground-working position, hitch means common to said plow elements, extensible means connecting said hitch means and each said plow element, means permitting alternate extension of said extensible means to move said hitch means laterally, means for locking either said extensible means against extension, and means responsive to vertical movement of one said plow element for releasing the locking means on one said extensible means.

9. In a two-way plow, in combination, laterally spaced supporting wheels, means connecting and journaling said wheels, alternately operable plow elements mounted on said connecting means for vertical movement to and from ground-working position, hitch means common to said plow elements, separate telescoping means connecting said hitch means and each said plow element, means permitting alternate extension of said telescoping means to move said hitch means laterally, means for locking either said telescoping means against extension, and means responsive to vertical movement of one said plow element for releasing the locking means on one said telescoping means.

10. In a two-way plow, in combination, laterally spaced supporting wheels, means connecting and journaling said wheels, alternately operable plow elements mounted on said connecting means for vertical movement to and from ground-working position, hitch means common to said plow elements, separate telescoping members connecting said hitch means and each said plow element, means permitting alternate extension of said telescoping members to move said hitch means laterally, means for locking said telescoping members against extension, means responsive to vertical movement of one plow element for controlling the locking means on the other plow element, and alternate means for controlling the locking means on one plow element in response to vertical movement of the same plow element.

11. A two-way plow comprising, in combination, laterally spaced supporting wheels, means connecting and journaling said wheels, longitudinally extending laterally spaced tool beams mounted on said connecting means for independent vertical movement, working toools on each beam, lifting means associated with each beam for effecting independent vertical movement thereof, a longitudinally extensible arm connected to one end of each said beam, a hitch member connecting the free ends of said arms, means for locking said arms against longitudinal movement, and means releasing the locking means for one said arm to permit lateral swinging movement of said hitch member in response to vertical movement of one of said beams.

12. A two-way plow comprising, in combination, laterally spaced supporting wheels, means connecting and journaling said wheels, longitudinally extending laterally spaced tool beams mounted on said connecting means for independent vertical movement, working tools on each beam, lifting means associated with each beam for effecting independent vertical movement thereof, a longitudinally pivotable member depending from one end of each said beam, means for locking said members against pivotal movement, a hitch frame connected to said members, and means releasing the locking means for one said member in response to vertical movement of one said beam.

13. In combination with a tractive vehicle having spaced rear wheels one of which is adapted to ride in a furrow, a two-way plow comprising laterally spaced supporting wheels one of which is adapted to travel in substantial alinement with the vehicle furrow wheel, means connecting and journaling said wheels, alternately operable longitudinally extending laterally spaced plow elements mounted on said connecting means for independent vertical movement to and from ground-working position, laterally movable hitch means on said plow, means responsive to vertical movement of one said plow element for permitting lateral movement of said hitch means to place the working plow element in correct plowing position with respect to the furrow wheel of the vehicle, and means for varying the range of lateral movement of said hitch means to permit said working plow element to travel in correct plowing position with respect to the furrow wheel of vehicles having different rear wheel spacings.

14. A two-way plow comprising a pair of tool-carrying plow beams adapted for alternate operation, lift means for each plow beam for alternately moving the latter to and from operating position, hitch means on the plow movable laterally to positions on opposite sides of a longitudinal center line therethrough, means associated with each plow beam for retaining the hitch means against lateral movement in either direction, and adjustable means responsive to actuation of the lift means for either beam for optionally releasing either of the hitch-retaining means on said beams.

15. A two-way plow comprising a pair of plow elements adapted for plowing in opposite directions, ground supports for said plow elements, a hitch frame laterally swingable with respect to said plow elements, extensible means including telescoping parts connecting said hitch frame and said plow elements in vertically spaced relation, and means for varying the effective length of said extensible means including means accommodating limited axial rotation of one said telescoping part with respect to the other to permit lateral swinging of the hitch frame.

JOHN R. ORELIND.
JAMES MORKOSKI.

REFERENCES CITED

The following references are of record in the file of this patent:

UNITED STATES PATENTS

| Number | Name | Date |
|---|---|---|
| 1,302,339 | Esping | Apr. 29, 1919 |
| 1,666,016 | Livermore | Apr. 10, 1928 |
| 1,813,506 | Strandlund | July 7, 1931 |
| 1,832,010 | Gallagher | Nov. 17, 1931 |
| 1,902,845 | Graham et al. | Mar. 28, 1933 |
| 2,126,357 | Todd | Aug. 9, 1938 |
| 2,188,413 | Markel | Jan. 30, 1940 |
| 2,312,258 | Martin | Feb. 23, 1943 |
| 2,363,901 | Silver | Nov. 28, 1944 |

FOREIGN PATENTS

| Number | Country | Date |
|---|---|---|
| 168,917 | Great Britain | 1921 |